Nov. 3, 1953  F. N. MARIANI  2,657,824
TANK CAP

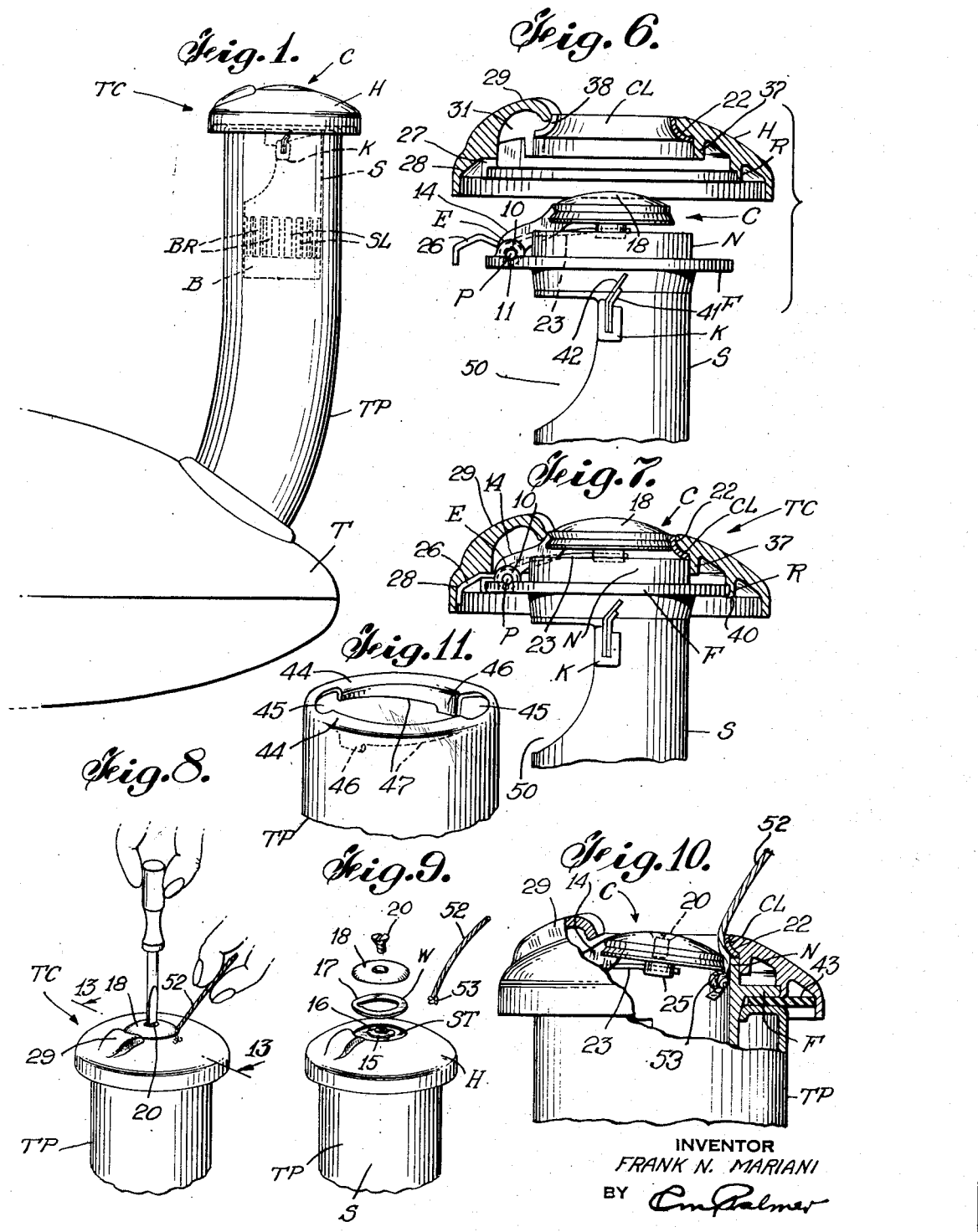

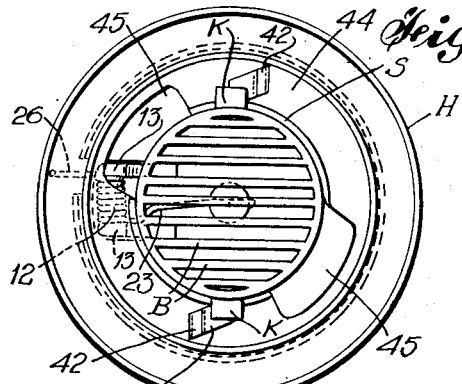
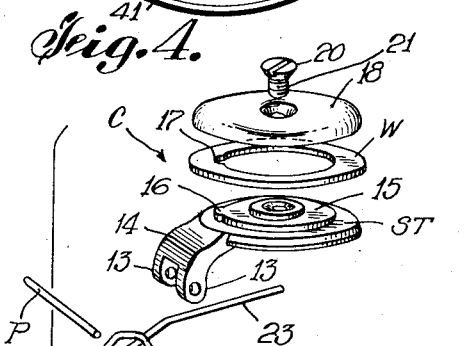
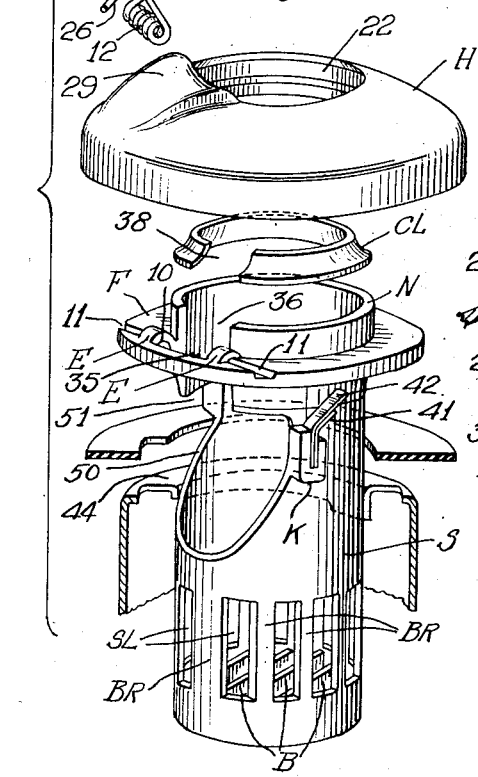
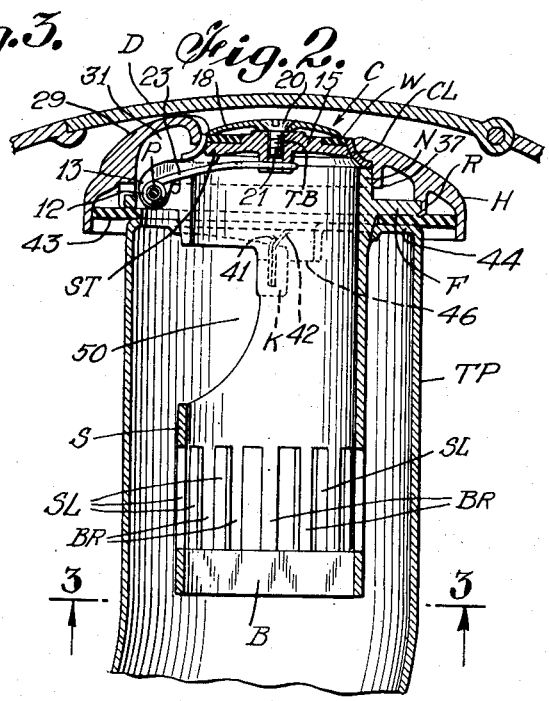
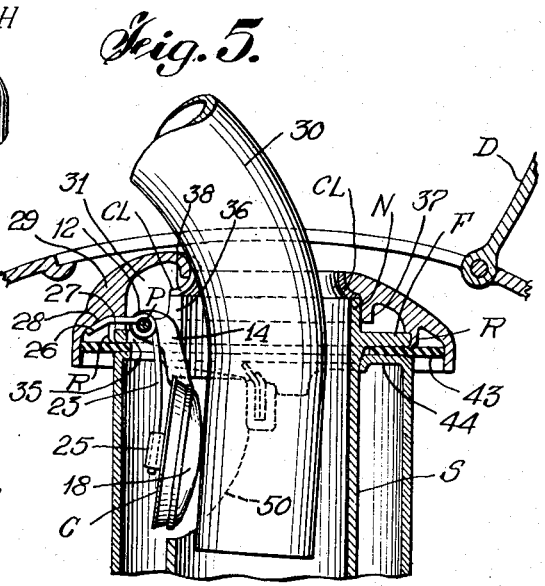

Filed July 20, 1950  3 Sheets-Sheet 3

INVENTOR
FRANK N. MARIANI
BY *Palmer*
ATTORNEY

Patented Nov. 3, 1953

2,657,824

UNITED STATES PATENT OFFICE 2,657,824

TANK CAP

Frank N. Mariani, New York, N. Y.

Application July 20, 1950, Serial No. 174,922

8 Claims. (Cl. 220—35)

The subject matter of this invention is a novel and serviceable tank cap and the important objects, salient features and functional and structural advantages thereof will be apparent from the following detailed description taken in connection with the accompanying drawings wherein:

Figure 1 illustrates in perspective the tank cap shown closed and effectively arranged at the upper part of the gasoline conducting pipe projecting from a gas tank.

Fig. 2 is an enlarged vertical sectional view of the tank cap shown in Fig. 1 disposed below and rendered inaccessible by a hinged door of a vehicle.

Fig. 3 is a horizontal sectional view taken on the line 3—3 of Fig. 2.

Fig. 4 is an exploded view of the tank cap shown associated with a companion fluid conducting pipe of a gas tank.

Fig. 5 is a view similar to Fig. 2 however showing the hinged closure of the tank cap fully opened upon insertion of a fluid conducting nozzle therein.

Fig. 6 is an exploded view showing the head of the tank cap detached from the shell thereof.

Fig. 7 is a view of the tank cap showing the shell permanently attached to the head thereof.

Fig. 8 illustrates the manner of maintaining the closure elevated when it is desired to remove the gasket thereof.

Fig. 9 is a view similar to Fig. 8 but showing inter alia, clamping disc and gasket detached from the seat of the pivoted closure.

Fig. 10 is an enlarged fragmentary elevational view of Fig. 8 however in part broken away and in section to illustrate the cooperation of the knotted end of the string and the pivoted closure.

Fig. 11 is a perspective view of the upper end of the fluid conducting pipe.

Figure 12:
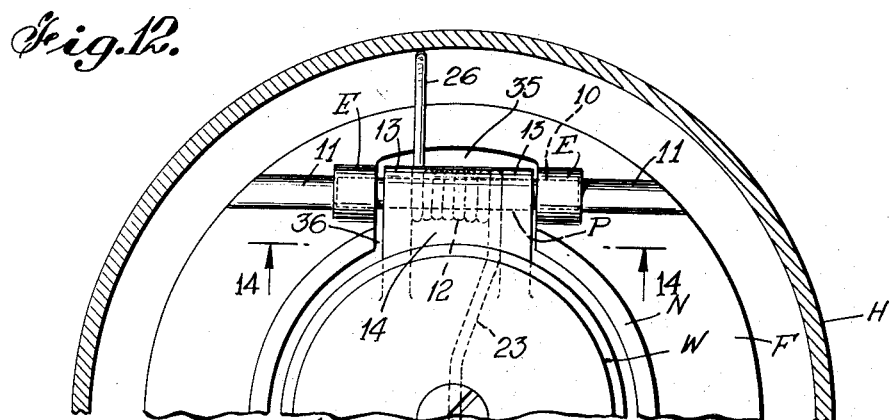
Fig. 12 is an enlarged fragmentary plan view of the shell and its normally elevated pivoted closure and also showing in section a part of the circular head.

Specifically referring to the drawings, the tank cap TC embodies the cylindrical shell S fixedly secured to annular head H.

Shell S is in the form of a tube having a bottom slotted wall characterized by the spaced bars B constituting a grill to prevent objectionable large objects flowing into tank pipe TP connected to gas tank T.

The tubular body of shell S is also in part in the form of a grill being interrupted by the spaced and vertical slots SL and defining the spaced vertical bars BR.

Integral with and overhanging the cylindrical shell S but spaced from the upper annular neck portion N of the latter is the laterally extending and circular flange F having integrally merged therewith the spaced and hollow upstanding ears E including alined openings 10 in communication with groove 11 for receiving fulcrum pin P threaded into and retained within the alined ears E.

Surrounding fulcrum pin P are convolutions of spring 12 confined between the spaced perforated lugs 13 of arcuate arm 14 depending upon the swingable closure broadly designated C having a circular boss 15 projecting from seat ST of the closure and provided with lip or key 16 received in notch 17 of the annular rubber washer W closely but removably fitting over boss 15.

A slightly dome shaped disc 18 is positioned on gasket W and is clamped thereagainst by threaded screw 20 having its shank 21 interconnected with the internally threaded bore TB (Fig. 2) of set ST. By this arrangement a new gasket may be readily substituted for the one previously retained by the closure C which of course is pivoted on fulcrum pin P by reason of the perforated lugs 13 swinging on this pin.

Normally closure C is held elevated in a horizontal position in seal tight engagement with the hardened and interrupted steel annular or frusto-conical collar CL seated on neck or rim N and fixedly retained within the upwardly contracted opening or mouth 22 of head H. More particularly offset end 23 of spring S holds closure C raised or closed as illustrated in Fig. 2. End 23 is confined within slot 24 (Fig. 13) transversing cylindrical projection 25 depending from seat ST of closure C.

The other offset end 26 of spring 12 projects through slot 27 (Figs. 5 and 15) in the rabbeted ring or member R depending from and within the dome shaped head H and bears against the inner inclined surface 28 of head H.

Figure 14:
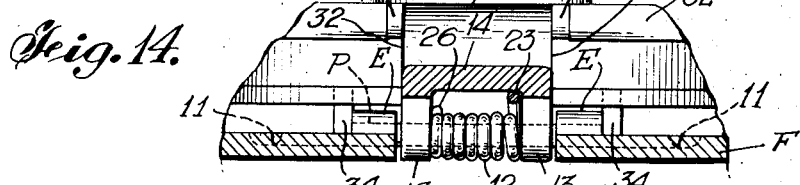
Fig. 14 is a sectional view on the line 14—14 of Fig. 12.

Rest 29 projects from head H and serves as a support for the fuel conducting nozzle 30, the latter actuating to depress closure C against the resistance of spring 12 and is adapted to be inserted through the fixed collar CL. Rest 29 embodies the relief recess 31 for swingably receiving arm 14. Relief recess 31 includes spaced sides 32 (Figs. 14 and 15) terminating in spaced lips 33 adjacent the top of opening 22 in head H. These sides as well as lips 32, straddle the pivoted arcuate arm 14 of closure C. These sides and lips also position arm 12 within the relief channel or recess 31 and cooperate to interlock therewith and thus constituting primary means to prevent rotational displacement of the head relative to shell S.

Supplementing positioning means is also provided to prevent rotational displacement of the shell S relative to the head H in the form of spaced lugs 34 depending from the latter for closely straddling spaced ears E (Fig. 14) to interlock therewith. Lugs 34 further serve to hold the fulcrum pin P within ears E, thus preventing longitudinal slippage thereof within groove 11.

Figure 15:
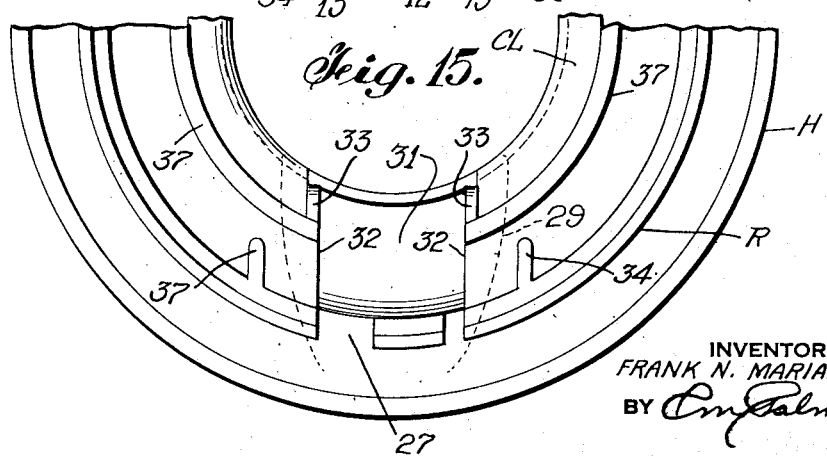
Fig. 15 is a fragmentary and underneath view of the head.

Pin P bridges the spaced ears 13 (Fig. 12) in part defining the relief recess or notch 35 in communication with gap 36 (Fig. 4) interrupting neck or rim N adapted to fit snugly into the inner depending and interrupted ring 37 of head H and having spaced ends terminating at the spaced lips 33 (Fig. 15).

Relief slot or gap 36 (Fig. 4) of neck or rim N is in communication with relief recess 35 of flange F and recess or notch 35 of flange F is in alinement with gap or slot 51 interrupting shell S and this last gap communicates with recess 35 and the closure receiving reentrant gap or cutout 50. Collar CL is also interrupted by relief gap 38 in alinement with slot 36 likewise to allow freedom of movement and reception of the swingable arm 14.

Figure 13:
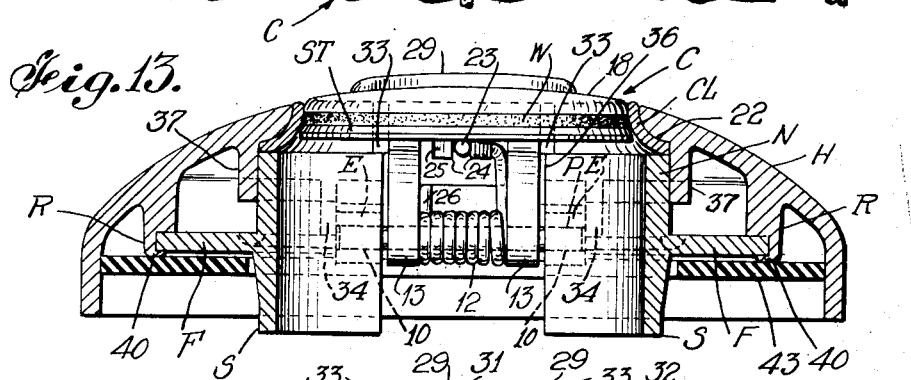
Fig. 13 is an enlarged sectional view of the upper end of the tank cap taken along the line 13—13 of Fig. 8.

Depending rings or interrupted annular members R and 37 of head H are concentrically arranged, the former being rabbeted to receive and position the interrupted laterally extending or overhanging flange F of the shell S after which its lower portion 40 is bent inwardly against this flange to fixedly anchor shell S to the head H and more particularly retain neck or rim N against collar CL (Fig. 13).

Extending laterally of shell S are the diametrically arranged lugs or keys K each carrying primary and secondary leaf springs 41 and 42, extending at an angle and beyond thereof whereby springs 42 which project beyond springs 41 cooperate with the inner surface of seat 44 of tank pipe TP to hold the ring rubber washer 43 on this seat or rim 44 pursuant to reception of keys K into the alined slots 45 of the tank pipe TP and pursuant to keys K striking lugs 46 depending from cam portions 47 in turn depending from seat 44 interrupted by the alined slots 45. By this arrangement a seal tight fit is maintained between the tank cap TC and tank pipe TP.

As previously stated, shell S embodies the relatively wide reentrant relief gap or cutout 50 to permit shifting of closure C by nozzle 30 downwardly and clear of the bore of the shell to preclude interference with the fuel conducted into the shell.

In the assembled relation of the tank cap, closure C is in a horizontal relation due to the action of spring arm 23. Thus this closure adequately cooperates with the interrupted but fixed collar CL to effectively seal the head H of the tank cap which is generally disposed and concealed under a swingable door D (Fig. 2) usually associated with one of the rear fender guards of an automobile.

Closure C is normally held raised by spring 12. Where it is desired to change washer 17, it is necessary to hold the closure elevated. This is accomplished by first inserting knot 53 of string 52 under closure C as shown in Fig. 10 and subsequently urging string 52 outwardly as shown in Fig. 8. Thus the closure is fully supported and raised to permit unthreading of screw 20 for detachment of clamping disc 18 prior to removal and replacement of washer W.

Slot or gap 36, recess 35, and slot or gap 51, all being in communication provide relief means in association with gap 38 of collar CL to permit swinging of arm 14 without interference while reentrant cutout 50 serves to receive closure C to permit when depressed its projection out of shell S.

Various changes may be made in details of construction and arrangement of parts without departing from the scope of the invention or sacrificing any of the advantages thereof inherent therein.

I claim:

1. In a tank cap, a tubular shell having a laterally extending flange and including a rim above and integral with said flange, a closure having an arm, means swingably holding said arm to said flange, a head embodying an opening, a hollow collar for removably receiving said closure and lining the wall of said opening, a member depending from said head and closely surrounding said rim, means depending from said head and fixedly holding said flange to retain said rim against said collar, and spring means for holding said closure elevated to removably seal said collar.

2. In a tank cap, a tubular shell having a laterally extending flange and including a relatively deep reentrant gap below said flange, a rim above and integral with said flange and in alignment with the body of said shell, a closure having an arm, means swingably holding said arm to said flange, a head embodying an opening, a hollow collar for removably receiving said closure and lining the wall of said opening, a member within and depending from said head and closely surrounding said rim, means depending from said head and fixedly holding said flange to retain said rim against said collar, and spring means for holding said closure elevated to removably seal said collar, said closure adapted to be pressed downwardly against the resistance of said spring means for movement thereof into said gap and out of said shell.

3. In a tank cap, a tubular shell having a laterally extending annular flange and including a relatively deep reentrant gap below said flange, an annular rim above and integral with said flange and in alignment with the body of said shell, a closure having an arm, means swingably holding said arm to said flange, a head in part overhanging said shell and embodying centrally arranged opening, an annular collar for removably receiving said closure and lining the wall of said opening, an annular member depending from said head and closely surrounding said rim, annular means depending from said head and fixedly holding said flange to retain said rim against said collar, and spring means for holding said closure elevated to removably seal said collar, said closure adapted to be pressed downwardly against the resistance of said spring means for movement thereof into said gap and out of said shell.

4. In a tank cap, a shell having a laterally extending flange and including a relatively deep reentrant gap below said flange, a rim above and integral with said flange and in alignment with the body of said shell, a closure having an arm, means swingably holding said arm to said flange; said rim, flange and shell having relief means independent of said gap to permit displacement of said arm out of said rim and into said gap, a head embodying an opening, a collar for removably receiving said closure and lining the wall of said opening, a member depending from said head and closely surrounding said rim, means depending from said head and fixedly holding said flange to retain said rim against said collar, and spring means for holding said closure elevated to removably seal said collar, said closure adapted to be pressed downwardly against the resistance of said spring means for movement thereof into said gap and out of said shell.

5. In a tank cap, a shell having a laterally extending flange and including a relatively deep reentrant gap below said flange, a rim above and integral with said flange and in alignment with the body of said shell, a closure having an arm, means swingably holding said arm to said flange; said rim, flange and shell having relief means independent of said gap to permit displacement of said arm out of said rim and into said gap, a head embodying an opening, a collar for removably receiving said closure and lining the wall of said opening, an annular member depending from said head and closely surrounding said rim, annular means depending from said head and fixedly holding said flange to retain said rim against said collar, spring means for holding said closure elevated to removably seal said collar, said closure adapted to be pressed downwardly against the resistance of said spring means for movement thereof into said gap and out of said shell, and a rest projecting from said head and including a chamber having sides straddling said arm to prevent rotary displacement of said head relative to said shell.

6. In a tank cap, a shell having a laterally extending flange and including a relatively deep reentrant gap below said flange, a rim above and integral with said flange and in alignment with the body of said shell, a closure having an arm, means swingably holding said arm to said flange; said rim, flange and shell having relief means independent of said gap to permit displacement of said arm out of said rim and into said gap, a head embodying an opening, a collar for removably receiving said closure and lining the wall of said opening, an annular interrupted member depending from said head and closely surrounding said rim, annular means disposed concentrically relative to said member and depending from said head and fixedly holding said flange to retain said rim against said collar, spring means for holding said closure elevated to removably seal said collar, said closure adapted to be pressed downwardly against the resistance of said spring means for movement thereof into said tap and out of said shell, and a rest projecting upwardly from said head and including an inner chamber for receiving said arm and having sides straddling the latter.

7. In a tank cap, a shell having an upper rim provided with a gap, a laterally extending flange below said rim and integral with said shell and including a notch in communication with said gap, said shell having a portion disposed below said flange and embodying a slot in alinement with said gap and communicating with said notch, said shell below said portion including a reentrant and relatively deep cutout, spaced hollow ears extending from said flange, a closure having an arm movably projecting into said notch between said ears, pin means receivable in said ears and traversing said notch for pivotally holding said arm, a head embodying an opening; a collar for removably receiving said closure and lining the wall of said opening, an annular interrupted member depending from said head and closely surrounding said rim, annular means spaced from and disposed outside and concentrically of said rim and depending from said head and including means cooperating with said flange to fixedly retain said rim against said collar, spring means in part surrounding said pin for holding a part of said arm in said gap and said closure elevated to removably seal said collar, said closure adapted to be depressed downwardly against the resistance of said spring means for movement thereof through said cutout and said part into said slot, and means depending from said head straddling said ears to prevent rotation of said head relative to said shell and to retain said pin between said ears.

8. In a tank cap, a shell having an upper rim provided with a gap, a laterally extending flange below said rim and integral with said shell and including a notch in communication with said gap, said shell having a portion disposed below said flange and embodying a slot in alignment with said gap and communicating with said notch, said shell below said portion including a reentrant and relatively deep cutout, spaced hollow ears extending from said flange, a closure having an arm movably projecting into said notch between said ears, said flange having a groove communicating with said ears, pin means receivable in said ears and groove and traversing said notch for pivotally holding said arm, a head embodying an opening, an interrupted collar for removably receiving said closure and lining the wall of said opening, an annular interrupted member depending from said head and closely surrounding said rim annular means spaced from and disposed outside and concentrically of said rim and depending from said head and including means cooperating with said flange to fixedly retain said rim against said collar, spring means in part surrounding said pin for holding a part of said arm in said gap and collar and said closure elevated to removably seal said collar, said closure adapted to be depressed downwardly against the resistance of said spring means for movement thereof through said cutout and said part into said slot, and spaced lugs between said member and annular means and depending from said head and straddling said ears to prevent rotation of said head relative to said shell and to retain said pin between said ears.

FRANK N. MARIANI.

References Cited in the file of this patent

UNITED STATES PATENTS

| Number | Name | Date |
|---|---|---|
| 218,719 | Doyle | Aug. 19, 1879 |
| 1,742,700 | Fisher | Jan. 7, 1930 |
| 2,145,759 | Fellows | Jan. 31, 1939 |
| 2,147,755 | Roberts | Feb. 21, 1939 |
| 2,247,509 | Lebus | July 1, 1941 |
| 2,414,909 | Snyder | Jan. 28, 1947 |
| 2,415,031 | Kuhn et al. | Jan. 28, 1947 |
| 2,421,350 | Odell | May 27, 1947 |
| 2,442,964 | Simonsen | June 8, 1948 |
| 2,534,003 | Culver et al. | Dec. 12, 1950 |